Patented Sept. 16, 1952

2,610,971

UNITED STATES PATENT OFFICE 2,610,971

PREPARATION OF ALPHA-AMINO ANTHRAQUINONE

Justin A. McSheehy, Somerville, and William A. Raimond, Plainfield, N. J., assignors to American Cyanamid Company, New York, N. Y., a corporation of Maine No Drawing. Application February 25, 1949, Serial No. 78,466

6 Claims. (Cl. 260—382)

This invention is concerned with the preparation of alpha-aminoanthraquinone. More particularly, the invention is concerned with a novel method of preparing high purity alpha-aminoanthraquinone from alpha-anthraquinone sulfonic acid by ammonolysis.

Industrially, alpha-aminoanthraquinone is a highly useful chemical. It is used, for example, in the manufacture of many vat dyes, among them a number of brilliant vat dyes of the triazine class. For the manufacture of many of these, an aminoanthraquinone of very high purity is a prerequisite.

In the past, a number of procedures for the synthesis of alpha-aminoanthraquinone by ammonolysis have been proposed. Roughly, these may be divided into two classifications, ammonolysis by free ammonia and by the use of ammonium salts. Unfortunately, as proposed, the methods in both classes have proved unsatisfactory, particularly in the production of alpha-aminoanthraquinones for use in preparing certain bright dyestuffs.

A good potential starting material, because of its availability, is alpha-anthraquinone sulfonic acid. Attempts have been made to utilize it. In employing ammonolysis with free ammonia, attempts were always made to follow the general directions for such types of reactions in accordance with those shown, for example, in Groggins, "Unit Processes in Organic Synthesis," 2nd edition, pages 330–331. It was generally accepted, as shown in U. S. Patent No. 1,933,236, that both high concentrations of ammonia and a high ratio of aqueous ammonia to the sulfonic acid were necessary and that it was best to carry out the reactions as rapidly as possible by the use of heat and pressure. Despite the prevalence of this opinion, results were not satisfactory. Yields were good but the product was too impure for the preparation of bright dyestuffs and could not be satisfactorily purified by any known practical method.

On the other hand, treatment with ammonium salts has likewise not been found highly useful. Ammonium arsenate, which has been recommended, suffers from the particular disadvantage of high toxicity and the resulting very serious disposal problem. Ammonium salt ammonolysis, like that making use of free ammonia, has not proved generally acceptable.

It is, therefore, the primary object of the present invention to devise a direct ammonolysis whereby alpha-aminoanthraquinone may be prepared simply and in high purity. Further, such a process should involve no unusual apparatus, require no extraordinary reaction conditions, and be capable of being carried out simply and easily with readily available starting materials such as the corresponding sulfonic acid.

Surprisingly, in accordance with the present invention, it has been found that a direct ammonolysis of alpha-sulfo-anthraquinone can be carried out with free ammonia to yield the desired results. This result has been obtained by using, not the conditions considered necessary in the prior art, but rather much lower ammonia concentrations, lower reactant ratios and lower reaction temperatures.

The results obtained in the use of the present process are surprising in view of past experiences based on principles which have been set forth in the general art. Both these general teachings and experience, based on general ammonolysis with free ammonia, would lead to the expectation that omitting both a high concentration and a high ratio of aqueous ammonia would not be conducive to optimum yield and purity. In fact, the reaction would not be expected to be successful at all, much less prove as completely satisfactory as it has been found in the present invention.

Entirely contrary to expectations based on earlier knowledge, in the new process of the present invention, radically less strenuous reaction conditions were found best. Dilute aqueous ammonia is used. Only a relatively small molar excess of real ammonia over the theory is required to obtain excellent yields in high purity.

In general, the process of the present invention is relatively simple. The starting material, alpha-anthraquinone sulfonic acid, preferably as its sodium or potassium salt, since it is usually obtainable in this form, is admixed with the other reactants. These will ordinarily constitute the ammonia, used as an aqueous solution in a slight excess over the molar equivalent of anthraquinone sulfonic acid, and an oxidizing agent for the sulfite formed in the reaction, such as nitrobenzene sodium or potassium sulfonate. Again a slight excess over the molecular equivalent is preferable. Other chemically equivalent oxidizing agents such as ammonium nitrate or potassium chlorate may be substituted if so desired.

The charge is placed in an autoclave equipped for agitation and diluted to an ammonia concentration of about 6% by volume. A concentration from as low as about 3% up to about 8% may be used. Preferably, a range of about 5-6% is utilized.

The charge is treated in an autoclave under heat and pressure until reaction is complete. The reaction temperature should be from about 150° to 185° C., preferably in the range of about 175° to 180° C. In general, a maximum pressure exceeding about 350 pounds per square inch will not be necessary. These conditions are maintained, preferably with agitation, until reaction is complete. This requires approximately eight to fifteen hours when the reaction is run at the preferred temperature of 175–180°. With shorter reaction times the yield falls off, and if the reaction is prolonged much beyond fifteen hours, the purity of product suffers.

When the reaction is complete, the charge is cooled to below 100°, the unreacted ammonia is vented, being recovered if desired, and the slurry is filtered. The resultant material is treated with hot dilute caustic soda solution; then with boiling water until alkali-free; and finally the product is dried. The product is obtained in excellent yields in the form of golden-red crystals usually melting at 253–254° C. Analysis shows the product to be practically chemically pure alpha-aminoanthraquinone suitable for immediate use in the production of bright vat dyestuffs.

While this general procedure is quite adequate for all purposes a further improvement in color can be made if it is desirable to do so. We have found that this can be accomplished by including boric acid in the autoclave charge. The exact manner in which it accomplishes its function is not fully understood. It is not used up in the reaction, appearing to pass through substantially unchanged.

Its use should not be confused with the old practice of using ammonium salts. It cannot form a borate with the ammonia since at reaction conditions ammonium borate would be completely dissociated. This is shown by the fact that there is no lowering of the vapor pressure during reaction such as would result from salt formation. The yield rate does not seem to be altered by its presence. Its only apparent effect on the reaction is to produce a purer product.

Use of the boric acid does not complicate the procedure in any way. It is preferably used in amounts of about ¼ to ⅓ the weight of the anthraquinone sulfonate. It is added directly to the autoclave charge. It is removed from the product during the final washing operations.

Examples of the process are set forth below as illustrative and not by way of limitation. Except as otherwise noted, all parts are by weight.

*Example 1*

A steel autoclave fitted with agitator is charged with 680 parts of real alpha-anthraquinone sodium sulfonate as a 40–50% wet press cake, 209 parts of nitrobenzene potassium sulfonate, and 160 parts real ammonia as 24% aqueous solution. The charge is then diluted with water to about 2600 parts by volume, reducing the ammonia concentration to approximately 6% by volume. The reaction mixture is then heated to 175–180° and kept at this temperature 12 hours. The charge is cooled, ammonia vented, and the product filtered. It is washed with hot dilute caustic soda and with water, and then dried. Alpha-aminoanthraquinone of high purity is obtained, M. P. 253–4° (uncorr.).

*Example 2*

To illustrate the practice using acid, to a mild steel autoclave fitted with an agitator, having a total capacity of about 3300 parts by volume, is charged:

680 parts of real alpha-anthraquinone sodium sulfonate as a 40–50% wet press cake;
209 parts of nitrobenzene potassium sulfonate;
163 parts of boric acid powder;
158 parts real ammonia as 24% aqueous solution.

The charge is then diluted with water to about 2600 parts, giving a concentration of ammonia of approximately 6% by volume. The autoclave is sealed and the reaction charge heated uniformly to 175°–180° C., which conditions are held for approximately 12 hours, the maximum pressure being 300 p. s. i. When reaction is complete, the autoclave is cooled to below 100° C., the ammonia is vented and the slurry filtered. The press cake is washed with boiling, very dilute caustic soda and then with hot water until alkali-free. The product is dried, yielding golden-red crystals melting at 253–254° C. (uncorrected).

The products obtained according to the above two examples are of substantially the same purity and yield. However, when they are made into yellow triazine dyes (for example as disclosed in U. S. Patent 1,663,474) the product made with boric acid gives somewhat greener and brighter dyeings.

The use of higher ammonia concentrations, or higher temperatures, results in a much less pure product, which is, for example, totally unsatisfactory for the preparation of yellow dyestuffs of the triazine series, and cannot be adequately purified by any of the generally known methods of purification.

We claim:

1. Process for the preparation of alpha-aminoanthraquinone from an alpha-anthraquinone monosulfonate which comprises reacting said alpha-anthraquinone monosulfonate with aqueous ammonia and an oxidizing agent to form alpha-aminoanthraquinone, said aqueous ammonia being of 3% to 8% strength by volume, said reaction being conducted at 150°–185° C. with agitation, and said oxidizing agent being selected from the group consisting of nitrobenzene sodium and potassium sulfonates.

2. Process according to claim 1 in which the reaction temperature is 175°–180° C.

3. Process according to claim 2 in which the reatcion time is about 8 to 15 hours.

4. Process according to claim 1 in which the strength of the aqueous ammonia is 5% to 6% by volume.

5. Process according to claim 1 in which the reaction mixture includes boric acid.

6. Process according to claim 1 in which the reaction mixture includes a weight of boric acid approximately ¼ to ⅓ the weight of the anthraquinone sulfonate.

JUSTIN A. McSHEEHY.
WILLIAM A. RAIMOND.

REFERENCES CITED

The following references are of record in the file of this patent:

UNITED STATES PATENTS

| Number | Name | Date |
|---|---|---|
| 1,255,719 | Dutoit | Feb. 5, 1918 |
| 1,933,236 | Wuertz | Oct. 31, 1933 |

FOREIGN PATENTS

| Number | Country | Date |
|---|---|---|
| 59,570 | Switzerland | Nov. 11, 1911 |
| 150,799 | Switzerland | Nov. 15, 1931 |